United States Patent
Dillinger et al.

(10) Patent No.: US 9,656,580 B2
(45) Date of Patent: May 23, 2017

(54) INCLINATION-ADJUSTABLE HEAD RESTRAINT

(71) Applicant: JOHNSON CONTROLS GMBH, Burscheid (DE)

(72) Inventors: Thomas Dillinger, Ratingen (DE); Thomas Jakubec, Bergheim (DE)

(73) Assignee: JOHNSON CONTROLS GMBH, Burscheid (DE)

( * ) Notice: Subject to any disclaimer, the term of this patent is extended or adjusted under 35 U.S.C. 154(b) by 0 days.

(21) Appl. No.: 14/373,249

(22) PCT Filed: Jan. 18, 2013

(86) PCT No.: PCT/EP2013/050953
§ 371 (c)(1),
(2) Date: Jul. 18, 2014

(87) PCT Pub. No.: WO2013/107868
PCT Pub. Date: Jul. 25, 2013

(65) Prior Publication Data
US 2015/0054325 A1    Feb. 26, 2015

(30) Foreign Application Priority Data

Jan. 19, 2012 (DE) .................. 10 2012 000 903
Apr. 2, 2012 (DE) .................. 10 2012 006 549
Jun. 28, 2012 (DE) .................. 10 2012 012 866

(51) Int. Cl.
*A47C 7/38* (2006.01)
*B60N 2/48* (2006.01)
(Continued)

(52) U.S. Cl.
CPC ......... *B60N 2/4841* (2013.01); *B60N 2/4847* (2013.01); *A47C 1/10* (2013.01);
(Continued)

(58) Field of Classification Search
CPC .......... A47C 7/38; A47C 1/10; B60N 2/4847; B60N 2/485; B60N 2/4852; B60N 2/66; A61G 15/125
(Continued)

(56) References Cited

U.S. PATENT DOCUMENTS 4,674,792 A * 6/1987 Tamura ............... B60N 2/4847
                                                  297/408
4,674,797 A * 6/1987 Tateyama ............ B60N 2/4847
                                                  297/391
(Continued)

FOREIGN PATENT DOCUMENTS

DE        197 11 006 A1     12/1997
DE     1020090 36 896 B3    9/2010
(Continued)

OTHER PUBLICATIONS

International Preliminary Report on Patentability in PCT/EP2013/050953 dated Jul. 22, 2014, 11 pages.
(Continued)

*Primary Examiner* — Syed A Islam
(74) *Attorney, Agent, or Firm* — Foley & Lardner LLP

(57) ABSTRACT

A head restraint allows adjustment of the angle of inclination of a support structure relative to a holding structure, in particular a holding bar.

10 Claims, 4 Drawing Sheets

(51) Int. Cl.
*B60N 2/66* (2006.01)
*A47C 1/10* (2006.01)

(52) U.S. Cl.
CPC *A47C 7/38* (2013.01); *B60N 2/66* (2013.01); *B60N 2002/4897* (2013.01)

(58) Field of Classification Search
USPC .................................. 297/408, 216.12, 409
See application file for complete search history.

(56) References Cited

U.S. PATENT DOCUMENTS

| | | | | |
|---|---|---|---|---|
| 5,236,245 | A * | 8/1993 | Harrell | 297/408 |
| 5,642,918 | A * | 7/1997 | Sakamoto et al. | 297/408 |
| 6,045,181 | A * | 4/2000 | Ikeda et al. | 297/216.12 |
| 6,345,549 | B1 * | 2/2002 | Lance | B60N 2/4852 74/500.5 |
| 7,070,205 | B2 * | 7/2006 | Becker | B60N 2/4861 180/282 |
| 7,717,508 | B2 * | 5/2010 | Becker | B60N 2/4885 297/216.1 |
| 2008/0073936 | A1 * | 3/2008 | Jeng | G06F 3/0481 296/180.1 |
| 2010/0283307 | A1 * | 11/2010 | Fujita | 297/408 |

FOREIGN PATENT DOCUMENTS

| | | |
|---|---|---|
| EP | 0 970 846 A1 | 1/2000 |
| JP | 61-151544 | 9/1986 |
| JP | 2000-229018 | 8/2000 |
| JP | 5296818 B2 * | 9/2013 ........... B60N 2/4221 |

OTHER PUBLICATIONS

Office Action dated Apr. 14, 2015, in corresponding Japanese application No. 2014-552637, 3 pages.
International Search Report dated Jun. 13, 2013 in PCT/EP2013/050953.
Office Action dated Jan. 29, 2014 in German Patent Application No. 10 2012 012 866.5.

* cited by examiner

INCLINATION-ADJUSTABLE HEAD RESTRAINT

CROSS REFERENCE TO RELATED APPLICATIONS

The present application is a U.S. National Stage of International Application No. PCT/EP2013/050953 filed on Jan. 18, 2013, which claims the benefit of German Patent Application Nos. 10 2012 000 903.8 filed on Jan. 19, 2012, 10 2012 006 549.3 filed on Apr. 2, 2012 and 10 2012 012 866.5 filed on Jun. 28, 2012, the entire disclosures of all of which are incorporated herein by reference.

The present invention relates to a head restraint in which the support structure is able to be adjusted in the angle of inclination thereof relative to a holding means, in particular a holding bar.

Such head restraints are sufficiently well known from the prior art but have a relatively large number of components and, as a result, are difficult and/or costly to mount and/or have the drawback that the force which is required in order to release a locking means, which fixes the head restraint in its respective position, is relatively high depending on the position of the head restraint.

It was, therefore, the object of the present invention to provide a head restraint which does not have the drawbacks of the prior art.

The object is achieved by a head restraint having a support structure which is able to be adjusted in the angle of inclination thereof relative to a holding means and having a positive connection means which cooperates positively and/or non-positively with a locking means and, as a result, fixes the support structure in the respective angular position thereof, wherein the positive connection means is provided integrally with the support structure.

The disclosure made with reference to this subject of the present invention applies equally to the other subject of the present invention and vice versa.

The present invention relates to a head restraint having a support structure. Said support structure is preferably provided with cushioning and particularly preferably with a cover. Said support structure may be adjusted in the angle of inclination thereof relative to a holding means, for example one or more holding bars, and fixed in the respectively desired position. To this end, the head restraint according to the invention comprises a locking means which is particularly preferably rotatably arranged on the holding means and which releasably cooperates with the positive connection means, in order to fix the support structure in the respective angular position thereof. According to the invention, this positive connection means is thus provided integrally with the support structure. For example, the support structure is produced with the positive connection means as a cast part or injection-molded part, preferably of plastics material. Preferably the support structure comprises two positive connection means, in particular toothed rods, which in each case cooperate in a locking manner with the locking means. Preferably, the teeth of the toothed rod are shaped so that the support structure is able to be adjusted in the inclination thereof in one direction, in particular toward the head of a seat occupant, without the unlocking means being unlocked. However, an adjustment of the inclination is only possible in the opposing direction if the locking mechanism is unlocked.

Preferably, the holding means is provided in a U-shape, wherein the base of the U-shape serves as a rotational axis for the support structure. The arms of the U-shape are preferably fastened in each case to the backrest, in particular in a longitudinally displaceable manner. By means of the longitudinal displacement, the height of the head restraint may be adapted to the requirements of the seat occupant.

Preferably the locking means is rotatably arranged on the holding means, wherein the rotational axis is preferably provided on the locking means, in particular integrally. As a result, the number of parts required is reduced. By rotating about the rotational axis, the locking means is transferred from its locked position into its unlocked position and vice versa. The locking means may also be bent in a resilient manner, however, in order to bring said locking means from its locked position into its unlocked position.

Preferably, the head restraint according to the invention has at least one spring means which pretensions the locking means in the direction of the positive connection means provided on the support structure.

Preferably, the unlocking means is actuated by a spring means which, when the locking means is unlocked, automatically pulls back the support structure into its initial position, away from the head of the seat occupant.

A further or preferred subject of the present invention is a head restraint in which a locking means which fixes the support structure of the head restraint in a specific position relative to a holding means is connected to a spring means, wherein the spring means is provided with a restricted guidance means.

The disclosure made relative to this subject of the present invention applies equally to the other subject of the present invention and vice versa.

According to the invention or preferably, it is provided that the locking means is connected to a spring means, for example in order to pretension said locking means in the direction of the positive connection means, wherein the spring means is guided in a restricted manner. As a result, the spring means is lengthened and shortened along a defined path.

Moreover, the direction of the vector of the spring force which acts on the locking means, may be precisely fixed. Preferably, the restricted guidance means is provided to be substantially L-shaped.

Preferably, the spring means is a spiral spring, one end thereof being fastened to the support structure and the other end thereof being fastened to the locking means.

Preferably, the head restraint comprises a spring means which, when the locking means is unlocked or after the locking means is unlocked, automatically pulls back the support structure into its initial position away from the head of the seat occupant.

The invention is described hereinafter with reference to FIGS. 1-6. These explanations are provided merely by way of example and do not limit the general inventive idea.

Figure 1:
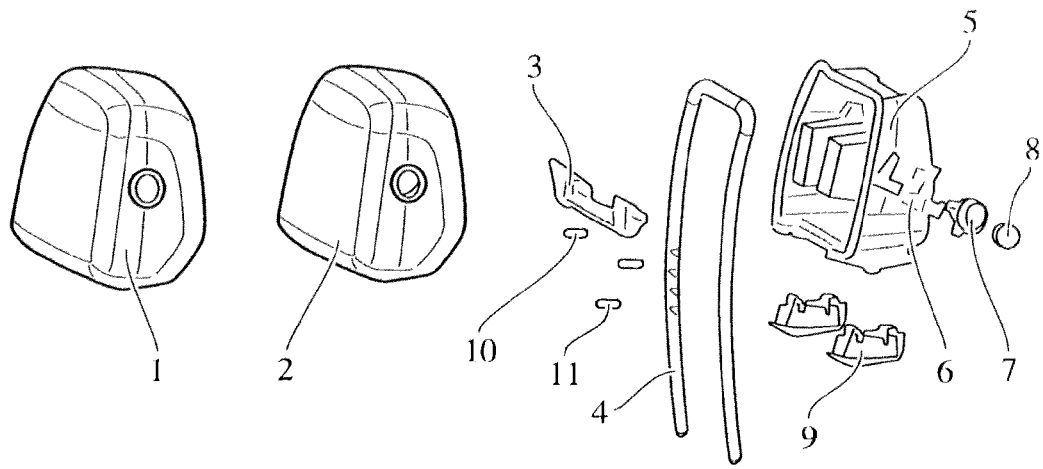
FIG. 1 shows the individual parts of the head restraint according to the invention.
Figure 2:
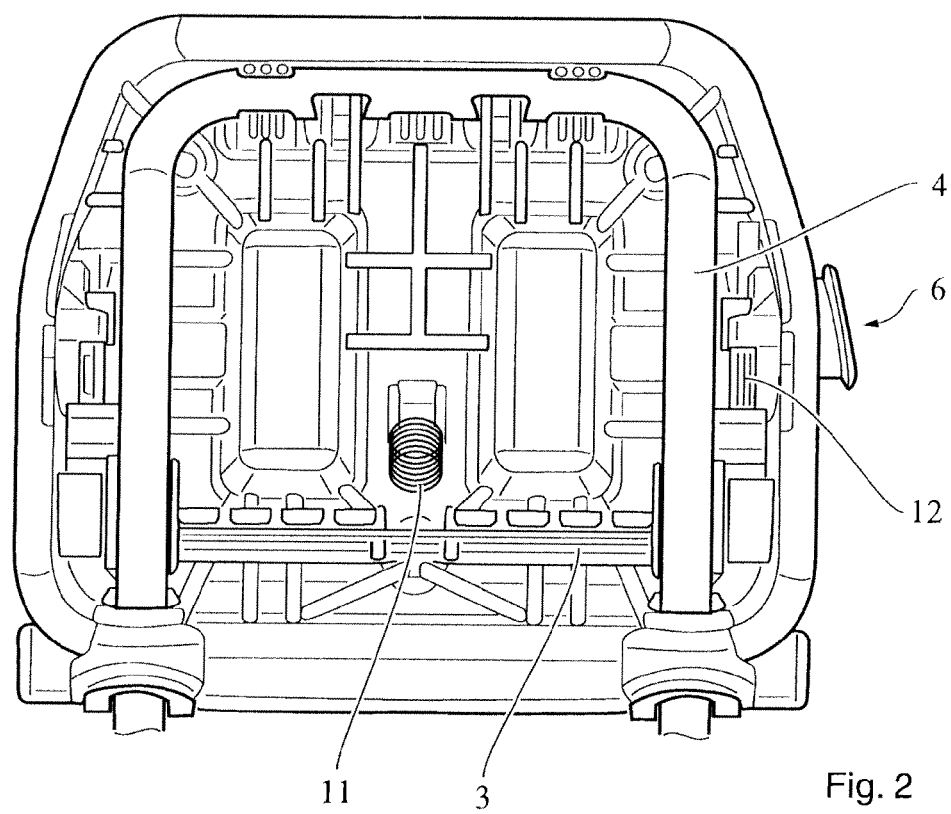
FIG. 2 shows a section through the head restraint according to the invention.
Figure 3:
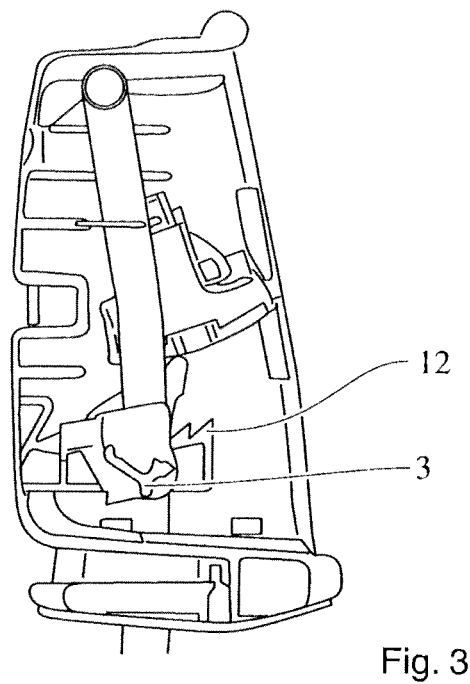
FIG. 3 shows the locking means of the head restraint according to the invention.

FIGS. 1-3 show the head restraint according to the invention. Said head restraint comprises a support structure 5 which is rotatably mounted on a holding means 4, in this case holding bars provided in a U-shape, i.e. adjustable in the angle of inclination thereof. In this case, the support structure 5 rotates about the base of the holding means provided in a U-shape. The two arms of the U-shape are preferably mounted in a longitudinally displaceable manner in the backrest of a vehicle seat or in the body of a motor vehicle. Preferably, the head restraint according to the invention is provided with cushioning 2, for example foam, and/or a cover 1. In order to be able to fix the support structure 5 in the respective angular position thereof, the head restraint according to the invention comprises a locking means 3 which cooperates with a positive connection means 12, in this case a toothed rod (see FIGS. 3 and 4) in a positive and/or non-positive manner, in order to fix the support structure 5 in the respective angular position thereof. In the present case, two toothed rods 12 are provided, said toothed rods being arranged in each case to the right and left of the holding means 4 and in each case cooperating with the locking means 3. According to the invention, each positive connection means 12 is integrally connected to the support structure 5. In order to prevent the support structure 5 from being automatically displaced and/or to avoid noise development, the head restraint according to the invention preferably has at least one, in this case two, spring means 10 which pretension the locking means 3 in the direction of the positive connection means 12. The locking means 3 is rotatably mounted on the holding means 4 and is rotated from its locked position into an unlocked position, in the present case counterclockwise. The actuation of the locking means takes place in the present case by a spring means 11, one end thereof being connected to the locking means 3 and the other end thereof being connected to the support structure 5. As a result, the support structure is automatically moved into its initial position as soon as the locking means no longer cooperates in a locking manner with the toothed rod. From this initial position, the support structure may then be inclined again in a stepwise manner in the direction of the head of the seat occupant. The locking means is actuated by an unlocking means 6, in the present case a push button 8 which is provided in a push button housing 7. The person skilled in the art understands that other unlocking means may also be provided. In particular for aesthetic reasons, covering means 9 are preferably provided in the region of the holding means 4, said covering means, however, also preventing injury to the seat occupant on the head restraint according to the invention.

Figure 4:
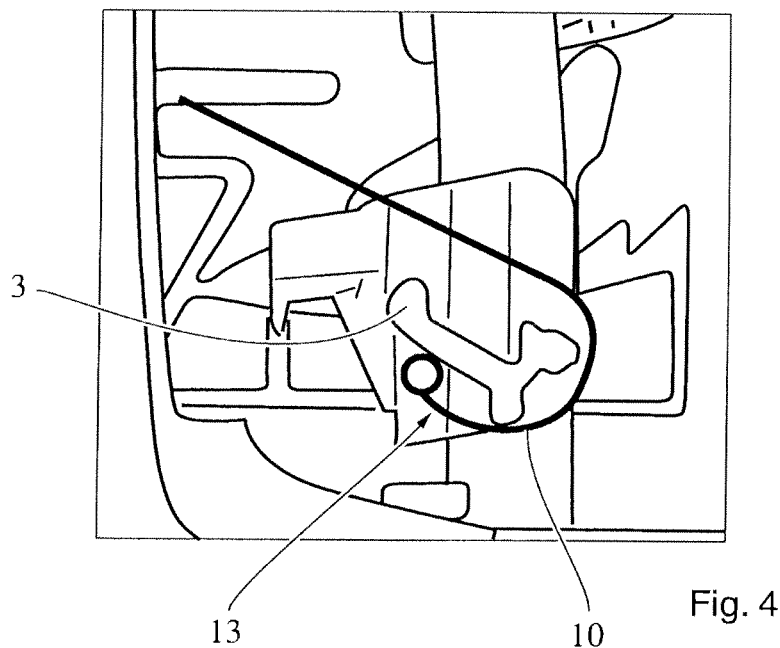
FIG. 4 shows a specific embodiment of a spring means.

FIG. 4 shows a particular embodiment of the spring means which pretensions the locking device against the positive connection means, in this case the toothed rod. In the present case, said spring means comprises a resilient region 13 which presses the locking means 3 in the direction of the toothed rod 12. Preferably two resilient regions 13 are provided.

Figure 5:
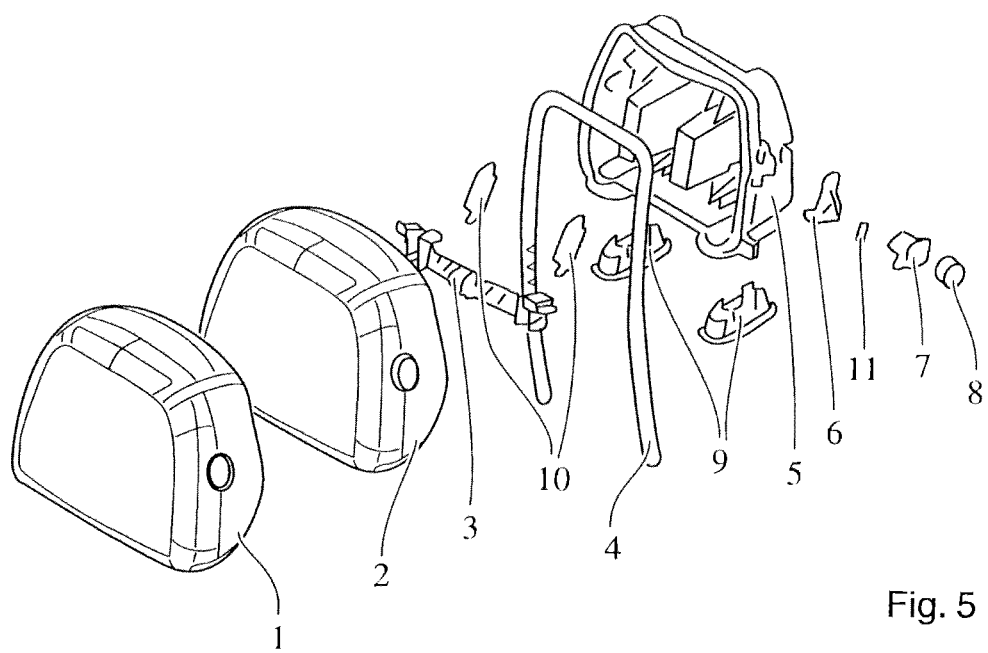
FIG. 5 shows the individual parts of the head restraint according to the invention.
Figure 6:
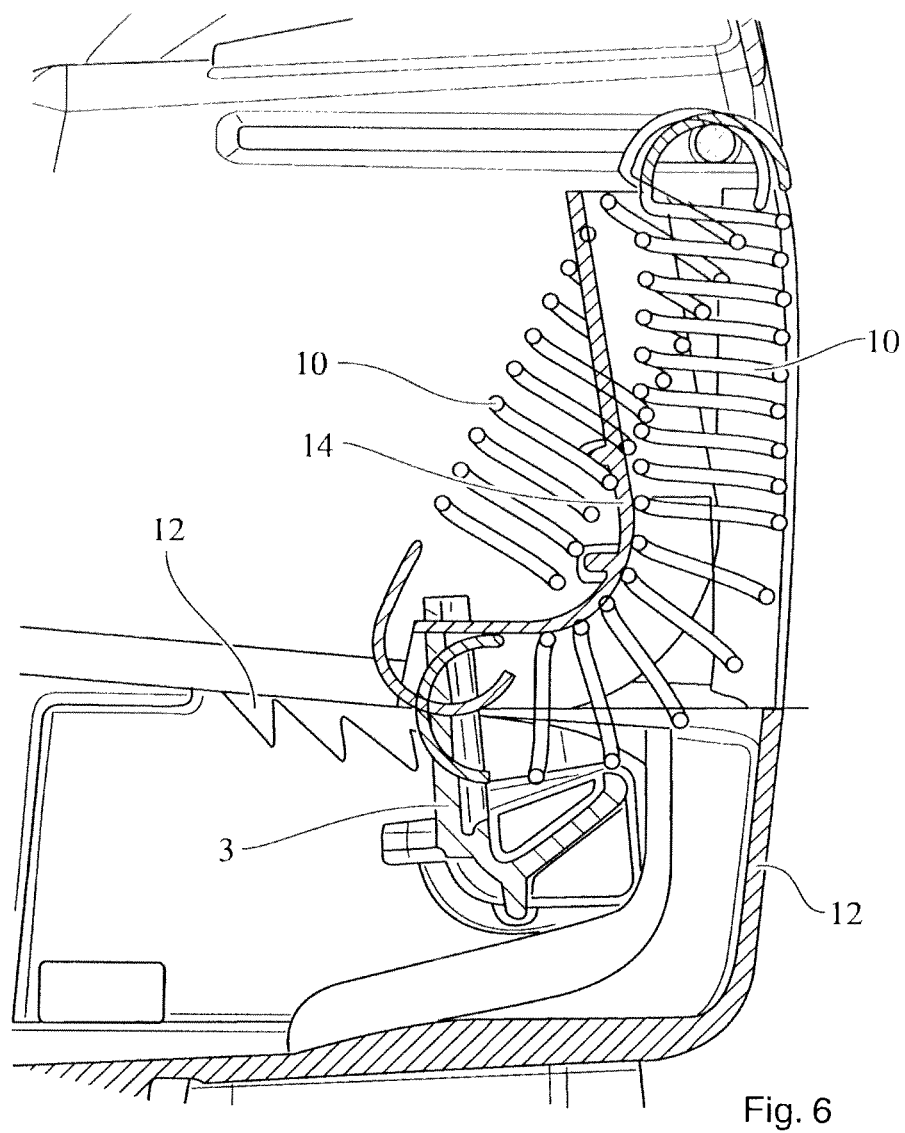
FIG. 6 shows the restricted guidance means of the spring means.

FIGS. 5 and 6 show a further embodiment of the head restraint according to the invention. Said head restraint comprises a support structure 5 which is rotatably mounted on a holding means 4, in this case holding bars provided in a U-shape, i.e. adjustable in the angle of inclination thereof. In this case, the support structure 5 rotates about the base of the holding means provided in a U-shape. The two arms of the U-shape are mounted, preferably in a longitudinally displaceable manner, in the backrest of a vehicle seat or in the body of a motor vehicle. Preferably, the head restraint according to the invention is provided with cushioning 2, for example foam, and/or a cover 1. In order to be able to fix the support structure 5 in the respective angular position thereof, the head restraint according to the invention comprises a locking means 3 which cooperates with a positive connection means 12, in this case a toothed rod (see FIG. 6) in a positive and/or non-positive manner, in order to fix the support structure 5 in the respective angular position thereof. In the present case, two toothed rods 12 are provided, said toothed rods being arranged in each case to the right and left of the holding means 4 and in each case cooperating with the locking means 3. Preferably, each positive connection means 12 is integrally connected to the support structure 5. In order to prevent the support structure 5 from being automatically displaced and/or to avoid noise development, the head restraint according to the invention preferably has at least one, in this case two, spring means 10 which pretension the locking means 3 in the direction of the positive connection means 12. The locking means 3 is rotatably mounted on the holding means 4 and is rotated from its locked position into an unlocked position, in the present case counterclockwise. The head restraint preferably has a further spring means 11 which moves the support structure automatically into its initial position as soon as the locking means no longer cooperates in a locking manner with the toothed rod. From this initial position, the support structure may then be inclined again in a stepwise manner in the direction of the head of the seat occupant. The locking means is actuated by an unlocking means 6, in the present case a push button 8 which is provided in a push button housing 7. The person skilled in the art understands that other unlocking means may also be provided. In particular for aesthetic reasons, covering means 9 are preferably provided in the region of the holding means 4, said covering means however also preventing injury to the seat occupant on the head restraint according to the invention.

FIG. 6 shows two possible embodiments of the spring 10, wherein only the right-hand embodiment is according to the invention. The spring means 10, in this case a spiral spring, is provided in the right-hand embodiment in a restricted guidance means 14. As a result the spring means is tensioned and released along a predetermined path and the spring means may be configured to be longer in comparison with the left-hand embodiment, whereby the force which is required to unlock the head restraint is only marginally increased along the adjustment path thereof. Moreover, the angle at which the spring force acts on the locking means may be set and this is not altered by the adjustment of the support structure.

LIST OF REFERENCE NUMERALS

1 Cover
2 Cushioning, foam
3 Locking means
4 Holding means, holding bar
5 Support structure
6 Unlocking means
7 Push button housing
8 Push button
9 Covering means
10 Spring means
11 Spring means
12 Positive connection means, toothed rod
13 Resilient region
14 Restricted guidance means

The invention claimed is:
1. A head restraint comprising:
  a holding structure that has a U-shape, wherein the U-shape includes two arms and a member there between connecting the two arms;

a support structure which is able to be adjusted in the angle of inclination thereof relative to the holding structure; and a positive connection structure which cooperates at least one of positively or non-positively with a locking structure and, as a result, fixes the support structure in the respectively desired angular position thereof, wherein the positive connection structure is provided integrally with the support structure, wherein the locking structure is rotatably arranged on each of the two arms of the U-shape of the holding structure, wherein the locking structure, which fixes the support structure of the head restraint in a specific position relative to the holding structure, is connected to a first spring structure, wherein the first spring structure is provided in a restricted guidance structure, wherein the restricted guidance structure defines a predetermined path for the first spring structure to move along, wherein the first spring structure extends between a first end and a second end along the predetermined path, wherein the restricted guidance structure is provided to be substantially L-shaped such that the predetermined path is substantially L-shaped and the first end of the first spring structure extends substantially perpendicularly to the second end of the first spring structure along the predetermined path.

2. The head restraint as claimed in claim 1, wherein locking structure is rotatably arranged on the holding structure and releasably cooperates with the positive connection structure.

3. The head restraint as claimed in claim 1, wherein the support structure is provided with the positive connection structure as a cast part or injection-molded part.

4. The head restraint as claimed in claim 1, further comprising a second spring structure, wherein, when the locking structure is unlocked, the second spring structure automatically pulls back the support structure into its initial position away from the head of the seat occupant.

5. The head restraint as claimed in claim 1, wherein a first portion of the restricted guidance structure is substantially perpendicular to a second portion of the restricted guidance structure such that a first portion of the predetermined path is substantially perpendicular to a second portion of the predetermined path.

6. The head restraint as claimed in claim 1, wherein the first end of the first spring structure is connected to the locking structure and the second end of the first spring structure is connected to the support structure.

7. A head restraint comprising:

a holding structure;

a support structure which is able to be adjusted in the angle of inclination thereof relative to the holding structure; and a positive connection structure which cooperates at least one of positively or non-positively with a locking structure and, as a result, fixes the support structure in the respectively desired angular position thereof, wherein the positive connection structure is provided integrally with the support structure, wherein the locking structure, which fixes the support structure of the head restraint in a specific position relative to the holding structure, is connected to a spring structure, wherein the spring structure is provided in a restricted guidance structure, wherein the restricted guidance structure defines a predetermined path for the spring structure to move along, wherein the predetermined path is not straight, wherein the spring structure extends between a first end and a second end along the predetermined path, wherein the restricted guidance structure is provided to be substantially L-shaped such that the predetermined path is substantially L-shaped and the first end of the spring structure extends substantially perpendicularly to the second end of the spring structure along the predetermined path.

8. The head restraint as claimed in claim 7, wherein a rotational axis of the locking structure is integrally provided thereon.

9. The head restraint as claimed in claim 7, wherein a first portion of the restricted guidance structure is substantially perpendicular to a second portion of the restricted guidance structure such that a first portion of the predetermined path is substantially perpendicular to a second portion of the predetermined path.

10. The head restraint as claimed in claim 7, wherein the first end of the spring structure is connected to the locking structure and the second end of the spring structure is connected to the support structure.

* * * * *